(12) United States Patent
Jung et al.

(10) Patent No.: US 7,743,173 B2
(45) Date of Patent: Jun. 22, 2010

(54) APPARATUS FOR AUTOMATICALLY INSTALLING/UNINSTALLING PERIPHERAL DEVICES, AND SYSTEM AND METHOD FOR AUTOMATICALLY DETECTING PERIPHERAL DEVICES USING THE SAME

(75) Inventors: Joon-Young Jung, Daejeon (KR); Jeun-Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 75 days.

(21) Appl. No.: 11/686,423

(22) Filed: Mar. 15, 2007

(65) Prior Publication Data

US 2007/0220181 A1 Sep. 20, 2007

(30) Foreign Application Priority Data

Mar. 15, 2006 (KR) .................. 10-2006-0024038

(51) Int. Cl.
*G06F 3/00* (2006.01)
*G06F 13/12* (2006.01)
*G06F 15/177* (2006.01)

(52) U.S. Cl. .................. 710/8; 710/10; 710/15; 710/16; 710/62; 709/220

(58) Field of Classification Search ............ 710/8, 710/10, 15, 16, 62; 709/220
See application file for complete search history.

(56) References Cited

U.S. PATENT DOCUMENTS 6,789,111 B1 * 9/2004 Brockway et al. .......... 709/222
6,813,670 B1 * 11/2004 Yao et al. .................. 710/302
2008/0278746 A1 * 11/2008 Chang et al. ............... 358/1.15

FOREIGN PATENT DOCUMENTS

| JP | 2005-346190 | 12/2005 |
|---|---|---|
| KR | 10-2002-0067720 | 8/2002 |
| KR | 1020030089045 A | 11/2003 |
| KR | 1020040024839 A | 3/2004 |
| KR | 10-2004-0093441 | 11/2004 |
| KR | 10-2005-0015882 | 2/2005 |
| KR | 10-2005-0060903 | 6/2005 |
| KR | 1020060070289 A | 6/2006 |

* cited by examiner

*Primary Examiner*—Niketa I Patel
(74) *Attorney, Agent, or Firm*—Ladas & Parry LLP

(57) ABSTRACT

Provided is an apparatus for automatically installing/uninstalling peripheral devices, and a system and method for automatically detecting peripheral devices using the same. The system includes a plurality of peripheral devices for periodically transmitting each of peripheral device information for auto-detection within a predetermined network region; a peripheral installation information providing device for providing data and information required for installing each peripheral device; and a peripheral device installing/managing apparatus for determining whether the peripheral device is installed based on the peripheral device information periodically transmitted from one peripheral device within a predetermined network region, receiving data and information required for installing the peripheral device from the peripheral installation information providing device through a network, and automatically installing and managing the peripheral device.

14 Claims, 3 Drawing Sheets

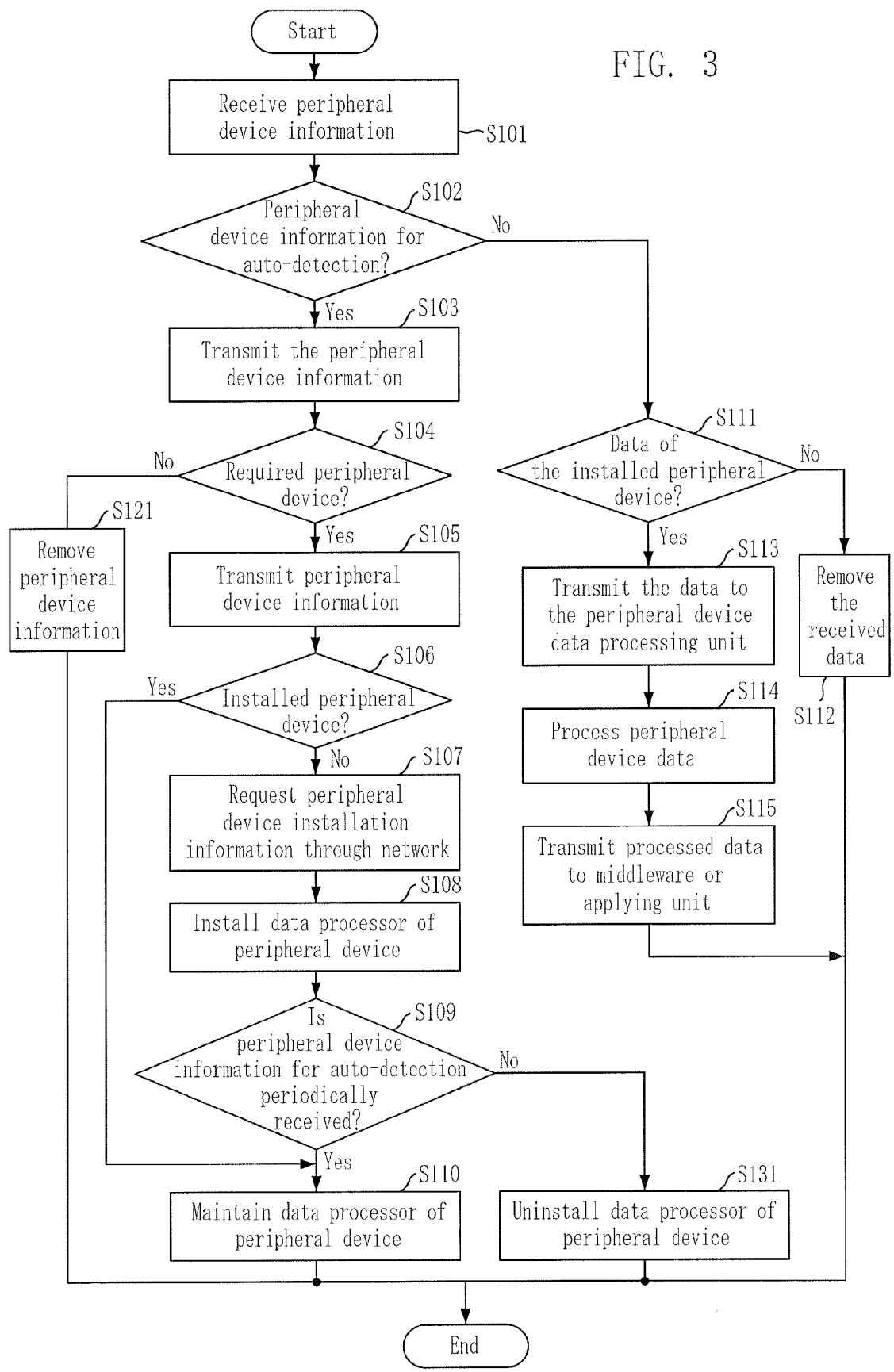

APPARATUS FOR AUTOMATICALLY INSTALLING/UNINSTALLING PERIPHERAL DEVICES, AND SYSTEM AND METHOD FOR AUTOMATICALLY DETECTING PERIPHERAL DEVICES USING THE SAME

FIELD OF THE INVENTION

The present invention relates to an apparatus for auto-installing/uninstalling peripheral devices, and a system and method for auto-detecting peripheral devices using the same; and, more particularly, to an apparatus which can automatically detect a new peripheral sensing apparatus and control apparatus which are peripheral devices required in a ubiquitous environment on a network and automatically install and manage the peripheral devices, and a system and method for auto-detecting peripheral devices using the same.

DESCRIPTION OF RELATED ART

In a ubiquitous environment, even small sensors become peripheral devices and there are many apparatuses around. When peripheral devices cannot be automatically recognized and detected in a system having many new apparatuses scattered around, it is difficult to use the new peripheral devices. However, a lot of information can be easily acquired when the new peripheral devices can be detected automatically.

At present, services between diverse home appliances are automatically detected and used through a middleware technology such as UPnP. However, the middleware technology is not proper to small peripheral devices such as a sensor.

Therefore, it is required to develop a method for automatically detecting and using small peripheral devices such as a sensor and this is proper to the ubiquitous environment.

SUMMARY OF THE INVENTION

It is, therefore, an object of the present invention to provide an apparatus that when a main device receives peripheral device information from a new peripheral device in a ubiquitous environment, determines whether the peripheral device is required by the main device based on peripheral device information, automatically installs the peripheral device required by the main device on the main device and manages the peripheral devices through a network, and system and method for auto-detecting peripheral devices using the same.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a system for automatically detecting peripheral devices, including: a plurality of peripheral devices for periodically transmitting peripheral device information for auto-detection, which is auto-detection information, within a predetermined network region; a peripheral installation information providing device for providing data and information required for installing each peripheral device; and a peripheral device installing/managing apparatus for determining whether the peripheral device is installed based on the peripheral device information periodically transmitted from one peripheral device within a predetermined network region, receiving data and information required for installing the peripheral device from the peripheral installation information providing device through a network, and automatically installing and managing the peripheral device.

In accordance with another aspect of the present invention, there is provided an apparatus for automatically installing/uninstalling peripheral devices, including: a communication unit for periodically receiving data from the peripheral device within the network region where many peripheral devices are included, and requesting and receiving data and information required for installing peripheral devices; a reception data managing unit for determining a kind of data by analyzing the received data; a peripheral device determining unit for determining whether a peripheral device needs to be installed when the data are peripheral device information for auto-detection; and a peripheral device managing unit for requesting and receiving data and information required for installing a peripheral device when a peripheral device needs to be installed, installing a data processor capable of processing data from the peripheral device, and notifying the reception data managing unit that the data processor is completely installed.

In accordance with another aspect of the present invention, there is provided a method for automatically detecting peripheral devices, including the steps of: a) receiving data periodically from a peripheral device within a predetermined network region where many peripheral devices are included; b) parsing the received data to determine a kind of data; c) when the data are peripheral device information, which is auto-detection information, determining whether a peripheral device needs to be installed; d) when a peripheral device needs to be installed, requesting and receiving data and information required for installing the peripheral device; and e) installing a data processor capable of processing the data from the peripheral device and processing the data transmitted from the installed peripheral device.

The peripheral devices according to the present invention notify own information to the neighborhood and the main device receiving information from peripheral devices determines whether the peripheral devices are required peripheral devices. When it is determined that the peripheral devices are required, the new peripheral devices can be detected and used by installing a driver through a network based on the information provided from the peripheral devices.

BRIEF DESCRIPTION OF THE DRAWINGS

The above and other objects and features of the present invention will become apparent from the following description of the preferred embodiments given in conjunction with the accompanying drawings, in which:

FIG. 3 is a flowchart describing a peripheral device auto-detecting method in accordance with an embodiment of the present invention.

DETAILED DESCRIPTION OF THE INVENTION

Other objects and advantages of the present invention will become apparent from the following description of the embodiments with reference to the accompanying drawings. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
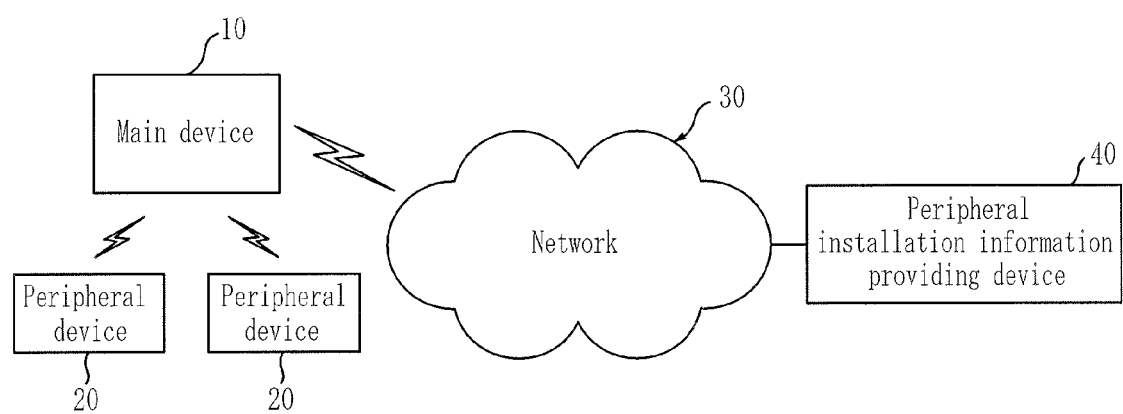
FIG. 1 is a block diagram showing a peripheral auto-detecting system in accordance with an embodiment of the present invention.

FIG. 1 is a block diagram showing a peripheral auto-detecting system in accordance with an embodiment of the present invention.

As shown in FIG. 1, the peripheral auto-detecting system according to the present invention includes a plurality of peripheral devices 20, a peripheral installation information providing device 40, and a main device 10.

A plurality of peripheral devices 20 periodically transmits peripheral device information to be automatically detected within a predetermined network region where a main device 10 manages a plurality of peripheral devices 20. The peripheral installation information providing device 40 provides data and information required for installing each peripheral device.

The main device 10 automatically installs and manages the peripheral devices 20 by determining whether the peripheral devices 20 are installed based on the peripheral device information transmitted from a predetermined peripheral device 20 among many peripheral devices within the predetermined network region and receiving data and information required for installing the peripheral devices 20 from the peripheral installation information providing device 40 through a network 30.

When the peripheral device information, i.e., auto-detection information, is not periodically received, the main device 10 uninstalls the installed peripheral devices.

An operation of the peripheral auto-detecting system according to the present invention will be roughly described hereinafter.

When the main device 10 receives peripheral device information for auto-detecting new peripheral devices 20, the main device 10 requests information and data required for installing the peripheral devices to the peripheral installation information providing device 40 of the peripheral devices 20 through the network 30. Also, the peripheral installation information providing device 40 provides information and data required for installing the peripheral devices 20 to the main device 10. Accordingly, the main device 10 receiving the information and data required for installing the peripheral devices 20 through the network 30 installs the peripheral devices 20 and can use the peripheral devices 20, i.e., can process the data transmitted from the peripheral devices 20.

Functions of the constituent elements of the peripheral auto-installing/uninstalling apparatus, i.e., the main device 10, and the peripheral auto-detecting system using the same will be described in detail with reference to FIG. 2.

Figure 2:
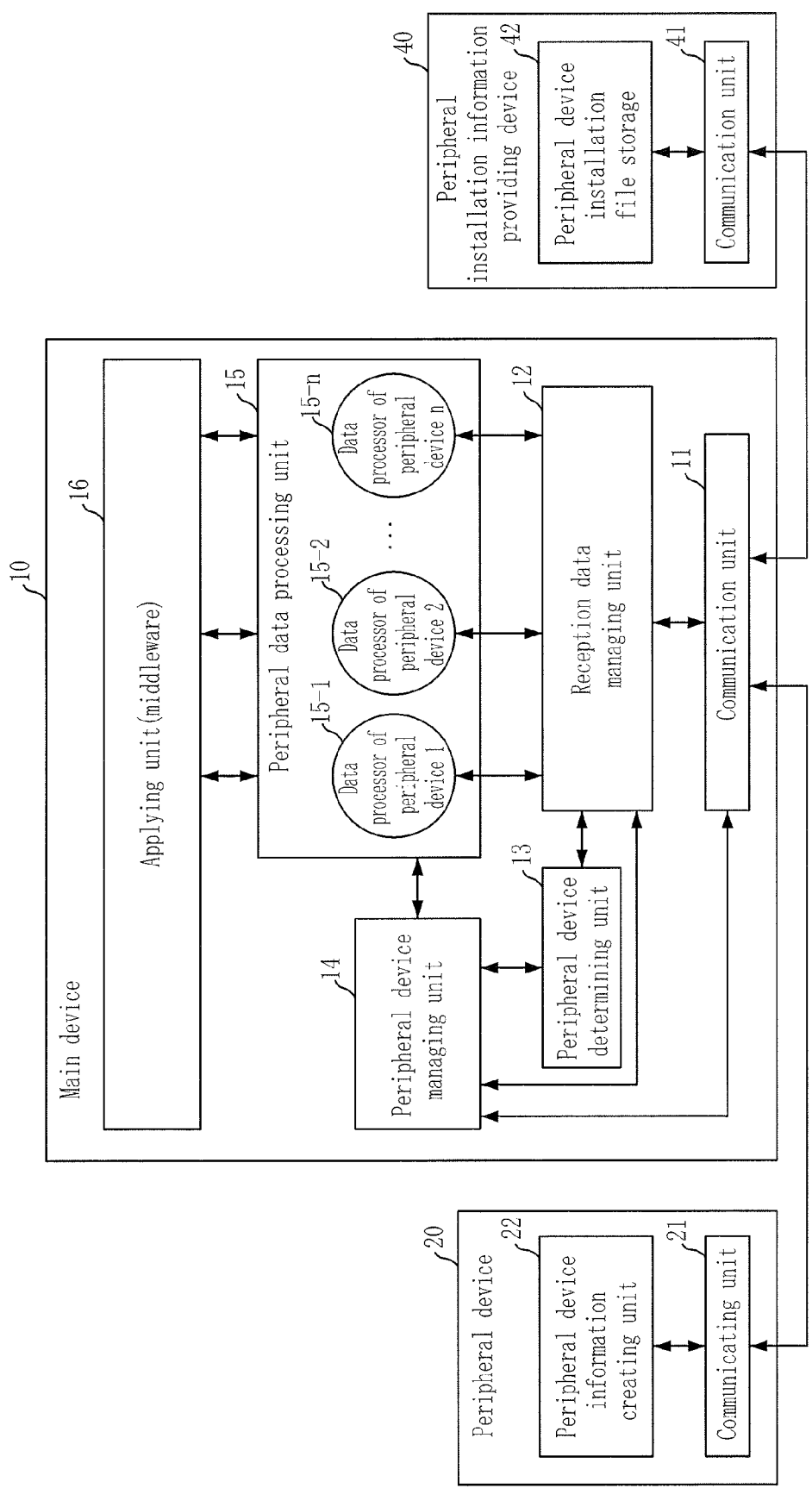
FIG. 2 is a block diagram illustrating a peripheral auto-installing/uninstalling apparatus and the peripheral auto-detecting system employing the same in accordance with the embodiment of the present invention.

FIG. 2 is a block diagram illustrating the peripheral auto-installing/uninstalling apparatus and the peripheral auto-detecting system using the same in accordance with the embodiment of the present invention.

As shown in FIG. 2, the peripheral auto-installing/uninstalling apparatus according to the present invention, which is the main device 10, includes a communication unit 11, a reception data managing unit 12, and a peripheral device determining unit 13.

The communication unit 11 periodically receives data from predetermined peripheral devices 20 among many peripheral devices within a network region where the main device 10 manages a plurality of peripheral devices 20, and requests and receives data and information required for installing the peripheral devices 20. The reception data managing unit 12 determines a kind of data by analyzing the received data. The peripheral device determining unit 13 determines whether the predetermined peripheral devices 20 are the peripheral devices that need to be installed in case that the data are peripheral device information, i.e., auto-detection information.

When the predetermined peripheral devices 20 are the peripheral devices that need to be installed, the peripheral device managing unit 14 requests and receives the data and information required for installing the peripheral devices, installs a data processor of the peripheral device 15n capable of processing the data from the peripheral devices 20, and notifies the reception data managing unit 12 that the installing process is completely performed.

When the predetermined peripheral devices 20 are not the peripheral devices that need to be installed, the peripheral device determining unit 13 removes the received peripheral device information, i.e., the auto-detection information.

Also, when the peripheral device information, i.e., the auto-detection information, are not periodically received from some installed peripheral devices 20, the peripheral device managing unit 14 uninstalls the installed peripheral devices 20.

When the received data are the data of the pre-installed peripheral devices 20, the reception data managing unit 12 transmits the received data to the data processor of the peripheral device 15n. Also, the data processor of the peripheral device 15n processes the data transmitted from the predetermined number of installed peripheral devices 20 and transmits the data to a middleware or an applying unit 16. When the received data are not the data of the pre-installed peripheral devices 20, the reception data managing unit 12 removes the received data.

An operation of the peripheral auto-installing/uninstalling apparatus, i.e., the main device 10, and the peripheral auto-detecting system using the same will be described.

According to the detail description with reference to FIG. 2, the peripheral devices 20 periodically transmit own information, i.e., peripheral device information, created through the peripheral device information creating unit 22 through a communication unit 21. Subsequently, the main device 10 receives the peripheral device information transmitted from the peripheral devices 20 through the communication unit 11. The data received in the communication unit 11 are transmitted to the reception data managing unit 12.

Subsequently, the reception data managing unit 12 analyzes the received data and determines whether the received data are information on the peripheral devices 20, i.e., peripheral device information, or the data transmitted from the peripheral devices 20. When it turns out that the received data are the information on the peripheral devices 20, the peripheral device information is transmitted to the peripheral device determining unit 13.

Subsequently, the peripheral device determining unit 13 determines whether the peripheral devices are the peripheral devices 20 required for the main device 10. When the peripheral device determining unit 13 determines that the peripheral devices are the peripheral devices 20 required for the main device 10, the peripheral device information is transmitted to the peripheral device managing unit 14.

The peripheral device managing unit 14 determines whether the received peripheral device information is information of the pre-installed peripheral devices 20 or information of the new peripheral devices 20. When the received peripheral device information is the information of the new peripheral devices 20, i.e., the peripheral device information, the peripheral devices 20 are installed based on the contents included in the transmitted peripheral device information. The peripheral device managing unit 14 accesses to the peripheral installation information providing device 40 through the communication unit 11 to install the peripheral devices 20 through the network 30.

The peripheral installation information providing device 40 receiving a message for installing the peripheral devices from the peripheral device managing unit 14 provides data and information required for installing the peripheral devices properly to the main device 10 from a peripheral device installation file storage 42 to the main device 10 through a communication unit 41.

The peripheral device managing unit 14 of the main device 10 receiving data and information required for installing the peripheral devices from the peripheral installation information providing device 40 installs a data processor of a corresponding peripheral device 15n in the inside of the data processor 15 of the peripheral device. When the data processor of the peripheral device 15n is properly installed, the peripheral device managing unit 14 notifies the reception data managing unit 12 that the data processor of the peripheral device 15n is completely installed.

When the peripheral devices 20 are completely installed as described above and the data are received from the installed peripheral devices 20, the reception data managing unit 12 transmits the data to the proper data processor of the peripheral device 15n. Subsequently, the data processed in each data processor of the peripheral device 15n are transmitted to the middleware or the applying unit 16.

The above-mentioned example is only an example that the peripheral devices 20 can be detected based on a network and the present invention is not limited to the example.

FIG. 3 is a flowchart describing a peripheral device auto-detecting method in accordance with an embodiment of the present invention.

The communication unit 11 of the main device 10 receives information of the peripheral devices 20, i.e., peripheral device information, from the peripheral devices 20 and transmits the information of the peripheral devices 20 to the reception data managing unit 12 at step S101.

The reception data managing unit 12 of the main device 10 determines whether the peripheral device information transmitted from the communication unit 11 is the peripheral device information transmitted from the peripheral devices 20 or actual data transmitted from the peripheral devices 20 at step S102.

When it turns out that the received peripheral device information is the peripheral device information transmitted from the peripheral devices 20 for auto-detection, the reception data managing unit 12 transmits the peripheral device information to the peripheral device determining unit 13 at step S103.

The peripheral device determining unit 13 determines whether the peripheral devices 20 are peripheral devices required for the main device 10 based on the peripheral device information transmitted from the reception data managing unit 12 at step S104.

When it turns out that the peripheral devices 20 are the peripheral devices required for the main device 10, the peripheral device determining unit 13 transmits the peripheral device information to the peripheral device managing unit 14 at step S105.

The peripheral device managing unit 14 checks whether the peripheral devices are installed on the main device 10 based on the received peripheral device information at step S106.

When the peripheral devices 20 are the peripheral devices which are not installed on the main device 10, the peripheral device managing unit 14 requests data and information required for automatically installing the peripheral devices, i.e., the peripheral device installation information, to the peripheral installation information providing device 40 through the communication unit 11 of the main device 10 at step S107. The peripheral installation information providing device 40 receiving a message for installing peripheral devices from the peripheral device managing unit 14 of the main device 10 provides data and information required for installing peripheral devices, i.e., peripheral device installation information, which are proper to the main device 10, from the peripheral device installation file storage 42 to the main device 10 through the communication unit 41.

The peripheral device managing unit 14 of the main device 10 receives the peripheral device installation information required for automatically installing the peripheral devices from the peripheral installation information providing device 40 through the communication unit 11 and installs the data processor of the peripheral device 15n at step S108. When each data processor of the peripheral device 15n is properly installed, the peripheral device managing unit 14 notifies the reception data managing unit 12 that the data processor of the peripheral device 15n is completely installed.

The peripheral device managing unit 14 determines whether the peripheral device information for auto-detection of the installed peripheral devices 20 are periodically transmitted through the communication unit 11 at step S109. When the installed peripheral devices 20 periodically transmit the peripheral device information for auto-detection, the peripheral device managing unit 14 maintains the installed data processor of the peripheral device 15n at step S110. When the installed peripheral devices 20 do not periodically transmit the peripheral device information for auto-detection, the peripheral device managing unit 14 uninstalls the installed data processor of the peripheral device 15n at step S131.

When it turns out at the step S106 that the peripheral devices are the installed peripheral devices 20, the installed data processor of the peripheral device 15n is maintained at step S110.

When a peripheral device is not the peripheral device required for the main device 10, the received peripheral device information is removed at step S121.

At the determination result of the step S102, when the peripheral devices 20 transmit data, the reception data managing unit 12 checks whether the received data are transmitted from the installed peripheral devices 20 at step S111. When the received data are the data of the non-installed peripheral devices 20, the reception data managing unit 12 removes the received data at step S112. When the received data are the data of the installed peripheral devices 20, the reception data managing unit 12 transmits the data to the data processor of the peripheral device 15n, processes the data in the data processor of the peripheral device 15n at step S114, and transmits the processed data to the middleware or the applying unit 16 at step S115.

When the main device receives the peripheral device information from new peripheral devices in a ubiquitous environment and determines whether the peripheral devices are required for the main device based on the transmitted peripheral device information, the present invention automatically installs the peripheral devices required for the main device on the main device through a network and manages the peripheral devices. Accordingly, the present invention can recognize even small sensors as the peripheral devices.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

The present application contains subject matter related to Korean patent application No. 2006-0024038, filed with the Korean Intellectual Property Office on Mar. 15, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A system for automatically detecting peripheral devices, comprising:
a plurality of peripheral devices periodically transmitting peripheral device information for auto-detection, which is auto-detection information, within a predetermined network region;
a peripheral installation information providing device for providing data and information required for installing each peripheral device; and
a peripheral device installing/managing apparatus for determining whether the peripheral device is a required peripheral device and when the peripheral device is determined to be the required peripheral device installing the peripheral device based on the peripheral device information periodically transmitted from one peripheral device within the network region, receiving data and information required for installing the peripheral device from the peripheral installation information providing device through a network, and automatically installing and managing the peripheral device,
wherein the peripheral device is connected to the peripheral device installing/managing apparatus through a wireless network, and wherein the peripheral devices comprise sensors.

2. The system as recited in claim 1, wherein the peripheral device installing/managing apparatus uninstalls the peripheral device when the peripheral device information auto-detection information is not periodically received.

3. An apparatus for automatically installing/uninstalling peripheral devices, comprising:
a communicating unit for periodically receiving data from a peripheral device within a network region where many peripheral devices are included, and requesting and receiving data and information required for installing peripheral devices, wherein the communicating unit is connected to the peripheral device through a wireless network, and wherein the peripheral devices comprise sensors;
a reception data managing unit for determining a kind of data by analyzing the received data;
a peripheral device determining unit for determining whether the peripheral device is a required peripheral device that needs to be installed when the data are peripheral device information for auto-detection; and
a peripheral device managing unit for requesting and receiving data and information required for installing the peripheral device when the peripheral device needs to be installed, installing a data processing unit capable of processing data from the peripheral device, and notifying the reception data managing unit that the data processing unit is completely installed.

4. The apparatus as recited in claim 3, wherein the peripheral device determining unit removes the received peripheral device information, which is auto-detection information, when the peripheral device is not the required peripheral device that has to be installed.

5. The apparatus as recited in claim 3, wherein the peripheral device managing unit uninstalls the peripheral device when the peripheral device information, which is the auto-detection information, is not periodically received from an installed peripheral device.

6. The apparatus as recited in claim 3, wherein the reception data managing unit transmits the received data to a peripheral device data processing unit when the received data are data of the pre-installed peripheral device, and removes the received data when the received data are not the data of the pre-installed peripheral device.

7. The apparatus as recited in claim 6, wherein the data processing unit processes the data transmitted from the installed peripheral device and transmits the data to a middleware.

8. A method for automatically detecting peripheral devices, comprising the steps of:
receiving data periodically from a peripheral device within a predetermined network region where a plurality of peripheral devices are included;
parsing the received data to determine a kind of data;
when the data are peripheral device information, which is auto-detection information, determining whether the peripheral device is a required peripheral device that needs to be installed;
when the peripheral device is the required peripheral device that needs to be installed, requesting and receiving data and information required for installing the peripheral device through a wireless network; and
installing a data processing unit capable of processing the data from the peripheral device and processing the data transmitted from the installed peripheral device, wherein the peripheral devices comprise sensors.

9. The method as recited in claim 8, further comprising the step of:
uninstalling the peripheral device when the peripheral device information, which is the auto-detection information, is not periodically received from the installed peripheral device, and maintaining the installed peripheral device when the peripheral device information is periodically received from the installed peripheral device.

10. The method as recited in claim 8, further comprising the step of:
removing the received peripheral device information, which is auto-detection information, when the peripheral device is not the required peripheral device that has to be installed.

11. The method as recited in claim 8, further comprising the step of:
removing the received data when the data are neither the peripheral device information nor the data of the pre-installed peripheral device.

12. The system as recited in claim 1, wherein the peripheral installation information providing device is provided apart from the peripheral device.

13. The system as recited in claim 3, wherein the communicating means requests and receives the data and information required for installing peripheral devices from a peripheral installation information providing unit, wherein the periph eral installation information providing unit is provided apart from the peripheral device.

14. The system as recited in claim 8, wherein the data and information required for installing peripheral devices is requested and received from a peripheral installation information providing unit, wherein the peripheral installation information providing unit is provided apart form the peripheral device.

* * * * *